United States Patent

[11] 3,616,852

| [72] | Inventor | Joseph C. Allen<br>Bellaire, Tex. |
|---|---|---|
| [21] | Appl. No. | 856,831 |
| [22] | Filed | Sept. 10, 1969 |
| [45] | Patented | Nov. 2, 1971 |
| [73] | Assignee | Texaco Inc.<br>New York, N.Y. |

[54] OIL RECOVERY PROCESS USING DILUTE ACID
2 Claims, No Drawings

[52] U.S. Cl. .................................................. 166/271, 166/274
[51] Int. Cl. .................................................. E21b 43/22, E21b 43/27
[50] Field of Search ............................................ 166/268, 270, 271, 273–275, 307; 252/8.55 C

[56] References Cited
UNITED STATES PATENTS

| 2,094,479 | 9/1937 | Vandergrift.................. | 252/8.55 C |
| 2,230,001 | 1/1941 | McConnell et al. .......... | 166/268 |
| 2,804,145 | 8/1957 | Holbrook ...................... | 166/271 |
| 3,091,292 | 5/1963 | Kerr .............................. | 166/271 |
| 3,103,975 | 9/1963 | Hanson ......................... | 166/271 X |
| 3,254,718 | 6/1966 | Dunlap.......................... | 166/307 |
| 3,259,187 | 7/1966 | Prats et al. ................... | 166/271 X |
| 3,483,923 | 12/1969 | Darley.......................... | 166/271 |

OTHER REFERENCES
Wade, James W. 5 Ways to Boost Injectivity of Waterflood Input Wells in World Oil, 168(2), Feb. 1, 1969, pp. 21–24.

*Primary Examiner*—Ian A. Calvert
*Attorneys*—K. E. Kavanagh and Thomas H. Whaley

ABSTRACT: Recovery of hydrocarbons from a subterranean hydrocarbon-bearing calcareous formation is effected by injecting into the formation via an injection well a dilute aqueous solution of hydrochloric acid and displacing the acid through the formation by injecting an aqueous medium which may comprise dilute hydrochloric acid wherein the acid reacts with the calcareous constituents of the formation thereby generating carbon dioxide and improving the permeability and the porosity of the formation leading to the improved recovery of hydrocarbons therefrom.

OIL RECOVERY PROCESS USING DILUTE ACID

BACKGROUND OF THE INVENTION

This invention relates to a method for the improved recovery of hydrocarbons from a subterranean, hydrocarbon-bearing, calcareous formation by injection of dilute aqueous hydrochloric acid into the formation through an injection well and displacing the acid through the formation with an injection well and displacing the acid through the formation with an aqueous medium which may comprise dilute hydrochloric acid thereby generating carbon dioxide within the formation and improving its permeability and porosity so as to facilitate the flow of fluids therein at a distance remote from the injection well thereby increasing recovery of hydrocarbons upon a subsequent waterflooding of the formation.

In the application of conventional procedures for the production of hydrocarbons from calcareous formations by the secondary recovery method of water injection, one of the principal difficulties that has been encountered is the generally low production response realized because of the low permeabilities and the consequent low rate of water acceptance of the communicating formation. These unfavorably low responses, both in injection rate and in overall production, have led to the abandonment of hydrocarbon production by water injection methods from many calcareous formations after only a minimal amount of the oil-in-place has been produced.

One of the techniques that is used to increase the permeability and porosity of a calcareous formation involves acid treating or acidization whereby an acid is introduced into the formation via a well, and under sufficient pressure is forced into the formation adjacent the well bore. The acid reacts with the material of the formation to effect solution of a portion of the material in the vicinity of the well bore. As a result, the interstices are increased in size and the permeability and porosity are thereby increased. The acidization is then followed by withdrawal of spent acid and carbon dioxide by backflow and production from the well. Although this technique results in acid treatment in the vicinity of the well bore, little beneficial effect is realized at any great distance from the well bore within the formation under treatment.

SUMMARY OF THE INVENTION

This invention relates to a method for the improved recovery of hydrocarbons from subterranean, hydrocarbon-bearing calcareous formations wherein a dilute aqueous solution of hydrochloric acid is injected into the formation via an injection well whereupon reaction occurs within the formation generating carbon dioxide within the formation and at the same time increasing the porosity and permeability of the formation.

Improved results as compared with conventional prior art practice may be obtained by injecting a dilute aqueous solution of hydrochloric acid into a subterranean hydrocarbon-bearing calcareous formation in accordance with the procedure described herein. In contrast with prior art procedures outlined above, the method of this invention employs only dilute aqueous hydrochloric acid which, together with the carbon dioxide generated in situ within the formation, is displaced into the formation by an aqueous-displacing fluid such as water. It is also within the scope of the invention to use dilute aqueous hydrochloric acid as the displacing fluid. Carbon dioxide is generated relatively uniformly throughout the formation creating and maintaining a free gas saturation. Improved permeability and porosity of the formation resulting from reaction of calcareous materials with hydrochloric acid over a large area, as contrasted with concentrated and limited area of reaction of the prior art, and retention of carbon dioxide within the formation results in greatly improved oil recovery when the oil is displaced by a suitable displacing medium.

DESCRIPTION OF THE PREFERRED EMBODIMENT

In accordance with the invention, improved recovery of hydrocarbons from hydrocarbon-bearing calcareous formations is obtained by the injection of a dilute aqueous solution of hydrochloric acid into the formation, to displace the hydrocarbons toward a production well from which they are produced.

A modification of the method includes the essential steps of (a) passing into the formation via an injection well a dilute aqueous solution of hydrochloric acid, (b) thereafter injecting water into the formation, to move the acid through the formation and displacing the hydrocarbons of the formation toward a production well, and (c) producing the hydrocarbons via the production well.

This procedure may be further modified to include the stepwise injection of smaller slugs of both the dilute aqueous solution of hydrochloric acid and the water drive medium which are injected into the formation in an alternating fashion.

The size of the slug may vary within rather wide limits and will depend on a number of conditions, including the thickness of the formation, its characteristics, and the conditions for the subsequent injection of the aqueous drive medium. Preferably, the size of the slug will be from about one-fourth to about 1½ pore volumes of the formation to be acidized.

The improvements realized by the method of invention include not only increased permeability and porosity of the formation, but also the establishment of a free gas saturation resulting from the in situ generation of carbon dioxide, which gas will be trapped in the formation. The establishment of a trapped free gas saturation has a beneficial result in increasing recovery of hydrocarbons. It has been shown that waterflooding in the presence of a trapped gas saturation obtained by the evolution of solution gas, results in improved oil recovery approximately equal to the volume occupied by the trapped gas.

In addition, the well-known beneficial effects resulting from the solution of carbon dioxide in the oil of the reduction in the oil viscosity and the increase in formation volume factor will be realized from the in situ generation of carbon dioxide.

Furthermore, the increase in permeability and porosity resulting from the action of the acid with the formation, will also increase the receptivity of the formation with an attendant increase in injectivity capacity to fluid injection which will result in a shortened overall time for the secondary process, resulting in a more favorable economic operation of the flood.

The mechanism whereby the improved recovery is obtained is believed to be as follows. The injected dilute aqueous solution of hydrochloric acid displaces the connate water and formation oil in the vicinity of the injection well and reacts with the calcareous constituents of the formation to generate carbon dioxide. This reaction also results in an increase in the permeability and porosity of the formation thereby increasing the injectivity capacity. The generated carbon dioxide dissolves in the connate water and the formation oil thereby leading to carbon dioxide-saturated connate water and oil. As the gas-saturated water and oil are displaced further from the injection well, the pressure drop existing in the formation causes evolution of the carbon dioxide from the fluids within the reservoir thereby establishing a trapped gas saturation within the formation. Upon subsequent water flooding, improved recovery occurs similar to that realized when a free gas phase has been established in a solution gas drive recovery process.

In addition, the solution of the carbon dioxide in the oil reduces the oil viscosity and increases the formation volume factor. Both of these effects reduce the residual stock tank oil saturation and give improved recovery.

Thus, the optimum conditions for waterflooding have been established in the formation by the creation of a free gas phase and a gas-saturated oil having the viscosity at a minimum and its formation volume factor at a maximum.

The concentration of the hydrochloric acid in the slug may vary depending upon the formation undergoing treatment.

Typically, the dilute aqueous solutions of hydrochloric acid employed in accordance with this invention contain between 0.05 and 5 percent by weight hydrogen chloride.

It will be apparent from the foregoing description that the method is subject to other modifications without departing from the scope of the invention as defined in the following claims.

I claim:

1. A method of recovering hydrocarbons from a subterranean hydrocarbon-bearing calcareous formation penetrated by at least one injection well and one production well in a throughput operation which comprises, introducing into said formation via said injection well a dilute aqueous solution of hydrochloric acid having a concentration of hydrogen chloride in the range of from about 0.05 to about 5 percent by weight, said acid reacting with said calcareous formation thereby increasing the permeability and porosity of said formation and generating carbon dioxide within said formation, and displacing formation hydrocarbons through said formation toward said production well by continuing injecting said dilute aqueous solution of hydrochloric acid into said formation while withdrawing said formation hydrocarbons via said production well.

2. A method for recovering hydrocarbons from a subterranean hydrocarbon-bearing calcareous formation penetrated by an injection well and a production well in a throughput operation which comprises, injecting into said formation through said injection well a slug of dilute aqueous solution of hydrochloric acid having a concentration of hydrogen chloride in the range of from about 0.05 to about 5 percent by weight in an amount within the range of from about one-fourth to about 1½ pore volumes of said formation sufficient to react with the calcareous constituents of said formation thereby substantially increasing the permeability and porosity of said subterranean formation and generating carbon dioxide within said formation, thereafter injecting water into said formation through said injection well and driving said dilute aqueous solution of hydrochloric acid and said carbon dioxide toward said production well and displacing formation hydrocarbons through said formation toward said production well, by continuing injecting slugs of said dilute aqueous solution of hydrochloric acid and water in alternate stepwise fashion, while withdrawing said formation hydrocarbons through said production well.